(12) United States Patent
Kaupp et al.

(10) Patent No.: US 8,129,021 B2
(45) Date of Patent: Mar. 6, 2012

(54) EFFECT PIGMENTS BASED ON SUBSTRATES FORMED FROM INORGANIC-ORGANIC MIXED PHASES, PRODUCTION AND USE THEREOF

(75) Inventors: Günter Kaupp, Neuhaus (DE); Ulrich Schmidt, Hersbruck (DE); Dirk Schumacher, Pegnitz (DE)

(73) Assignee: Eckart GmbH (DE)

( * ) Notice: Subject to any disclaimer, the term of this patent is extended or adjusted under 35 U.S.C. 154(b) by 169 days.

(21) Appl. No.: 12/675,168

(22) PCT Filed: Jun. 16, 2008

(86) PCT No.: PCT/EP2008/004847
§ 371 (c)(1),
(2), (4) Date: Mar. 4, 2010

(87) PCT Pub. No.: WO2009/030293
PCT Pub. Date: Mar. 12, 2009

(65) Prior Publication Data
US 2010/0298469 A1    Nov. 25, 2010

(30) Foreign Application Priority Data
Aug. 29, 2007   (DE) .................. 10 2007 041 027

(51) Int. Cl.
*C09B 1/00*   (2006.01)
(52) U.S. Cl. ........ 428/403; 428/404; 428/407; 106/415; 106/431; 106/447; 106/481; 106/490; 106/491
(58) Field of Classification Search .................. None
See application file for complete search history.

(56) References Cited

U.S. PATENT DOCUMENTS

| | | | | |
|---|---|---|---|---|
| 6,136,251 | A | 10/2000 | Etzbach et al. | 264/297.8 |
| 6,176,918 | B1 | 1/2001 | Glausch et al. | 106/415 |
| 6,653,415 | B1 | 11/2003 | Böttcher et al. | 526/135 |
| 2003/0047115 | A1 | 3/2003 | Bauer et al. | 106/415 |
| 2004/0009349 | A1 | 1/2004 | Brotzman, Jr. et al. | 428/379 |
| 2004/0144023 | A1 | 7/2004 | Bruckner et al. | 47/29.4 |
| 2005/0019575 | A1 | 1/2005 | Jungnitz et al. | 428/403 |
| 2006/0194057 | A1 | 8/2006 | Pfluecker et al. | 428/404 |
| 2007/0154709 | A1 | 7/2007 | Koch et al. | 428/379 |
| 2008/0295737 | A1 | 12/2008 | Henglein et al. | 106/421 |
| 2009/0252772 | A1 | 10/2009 | Henglein et al. | |

FOREIGN PATENT DOCUMENTS

| | | |
|---|---|---|
| DE | 196 18 569 | 11/1997 |
| DE | 196 38 797 | 3/1998 |
| DE | 196 39 783 | 4/1998 |
| DE | 198 38 241 | 2/2000 |
| DE | 10 2004 032 799 | 2/2005 |
| EP | 0 240 952 | 10/1987 |
| EP | 0 763 573 | 3/1997 |
| EP | 0 912 640 | 3/2000 |
| WO | WO 93/08237 | 4/1993 |
| WO | WO 01/92394 | 12/2001 |
| WO | WO 2005/019348 | 3/2005 |
| WO | WO 2005/070820 | 8/2005 |
| WO | WO 2007/076967 | 7/2007 |
| WO | WO 2007/098878 | 9/2007 |

OTHER PUBLICATIONS

"Aluminum Pigments Encapsulated by Inorganic-organic Hybrid Coating and their Stability in Alkaline Aqueous Media" authored by Li et al. and published in the Journal of Coatings and Technology Research (2008) 5 (1), 77-83.*
International Search Report and Written Opinion mailed May 12, 2009 in corresponding PCT International Application No. PCT/EP2008/004847.
KEN-REACT Reference Manual, Titanate, Zirconate and Aluminate Coupling Agents, 2nd revised edition, Summer 1993, pp. 2-21.
Hans-Georg Elias, "Malcromoleküle," 4th Edition, 1981, Hüthig & Wepf Verlag Basel, with full English-language translation.

* cited by examiner

*Primary Examiner* — Marc Zimmer
(74) *Attorney, Agent, or Firm* — Ostrolenk Faber LLP

(57) ABSTRACT

Effect pigments with a platelet-shaped substrate provided on at least one side with at least one coating of semitransparent metal and/or at least one high-index coating having a refractive index $\geq 2.0$. The platelet-shaped substrate includes at least one mixed inorganic/organic phase. Also, a method of producing effect pigments including the following steps:

a) combining at least one organic network former, at least one reactive organic component, at least one inorganic network former and/or nanoscale inorganic particles and a liquid phase to form a reaction composition,
b) applying the reaction composition to a sheetlike base,
c) forming a solidified mixed inorganic/organic phase,
d) converting the mixed inorganic/organic phase into platelet-shaped substrates, and
e) coating the platelet-shaped substrates with at least one coating of semitransparent metal and/or at least one high-index coating having a refractive index $\geq 2.0$.

70 Claims, No Drawings

EFFECT PIGMENTS BASED ON SUBSTRATES FORMED FROM INORGANIC-ORGANIC MIXED PHASES, PRODUCTION AND USE THEREOF

CROSS REFERENCE TO RELATED APPLICATIONS

The present application is a 35 U.S.C. §371 National Phase conversion of PCT/EP2008/004847, filed Jun. 16, 2008, which claims benefit of German Application No. 10 2007 041 027.3, filed Aug. 29, 2007, the disclosure of which is incorporated herein by reference. The PCT International Application was published in the German language.

TECHNICAL FIELD

The invention relates to effect pigments with platelet-shaped substrate provided at least on one side with at least one coating of semitransparent metal and/or at least one high-index coating having a refractive index $\geq 2.0$, and also to their production and use.

BACKGROUND

Conventional pearlescent pigments are based on products including the natural product mica, which constitutes a transparent, low-index, platelet-shaped substrate having a slightly yellowish intrinsic color. These substrates are coated with high-index oxides such as, preferably, $TiO_2$ and/or $Fe_2O_3$, resulting in the known pearl luster effects. In addition to its inherent color, mica has the disadvantages of being subject, as a natural product, to large variations, and possessing an inconsistent thickness, too many steps within one substrate, and an inconsistent size. Many attempts have been made, therefore, to replace mica with synthetic materials which can be varied and can be controlled more effectively in terms of their dimensions (thickness, thickness distribution, size) and optical properties (transparency, deliberate coloring).

EP 0 240 952 A2 describes a method of producing platelet-shaped material by applying liquid metal compounds or their solutions or sols to a continuous belt to form a thin film. This film is subsequently solidified and converted into platelet-shaped material.

WO 93/08237 likewise describes substrates composed of metal oxides, but, additionally, colorants have been introduced into the substrates. The metal oxides are formed by applying a corresponding precursor in the form of a thin film to a continuous belt. The solidified film that results from drying is treated with acid, coated, washed, and then separated from the support medium. Coating at least one side of the film with semitransparent metal layers or high-index metal oxides generates the conditions required in optical terms for effect pigments.

Pearlescent pigments based on a platelet-shaped substrate of aluminum oxide are described in EP 0 763 573 A2.

$Al_2O_3$-based pearlescent pigments in particular, with regard to their mechanical properties, are very hard and brittle. Pigments of this kind may cause damage, for example, to circuit lines in automotive finishing systems.

Pearlescent pigments having a substrate composed of C-glass are described in EP 0 912 640 E1.

Furthermore, effect pigments based on purely organic substrates are known from WO 01/92394 A1. With this kind of effect pigment, the adhesion of the metal oxide layers to the purely organic substrate is poor.

DE 10 2004 032 799 A1 describes effect pigments of uniform size and shape. The platelet-shaped substrates possess a circular or elliptical shape or else a polygonal shape and are composed of the metal oxides already known.

DE 196 38 797 A1 likewise describes effect pigments of uniform size and shape. In this case, however, the substrates are composed of organic, polymerizable materials. The compounds which can be incorporated by copolymerization include liquid-crystalline compounds. The polymerization is carried out in a sheetlike structure having continuous openings of defined shape and size, such as, for example, meshes made of plastic or of metal, the mesh size defining the geometry of the pigments produced.

A disadvantage effecting some conventional effect pigments is their great hardness. Particularly when using pearlescent pigments based on $Al_2O_3$ platelet substrates, the pumped circulation of paints or varnishes in pipeline systems, or application via spraying nozzles, may be accompanied by damage to the pipelines or spray nozzles, through abrasion.

A disadvantage effecting effect pigments based on organic-chemical substrates is that layers of metal oxide applied to them are readily detachable.

SUMMARY

It is an object of the invention, then, to provide effect pigments which on the one hand are mechanically stable and on the other hand have a somewhat reduced hardness.

The object on which the invention is based is achieved through the provision of effect pigments with platelet-shaped substrate provided at least on one side with at least one coating of semitransparent metal and/or at least one high-index coating having a refractive index $\geq 2.0$, the platelet-shaped substrate comprising at least one mixed inorganic/organic phase.

Preferred developments of the invention are specified in dependent claims 2 to 39.

The object is further achieved by a method which comprises the following steps:
(a) combining at least one organic network former and at least one reactive organic component and at least one inorganic network former and/or nano-scale inorganic particles and also a liquid phase to form a reaction composition,
(b) applying the reaction composition to a sheetlike base,
(c) forming a solidified mixed inorganic/organic phase,
(d) converting the mixed inorganic/organic phase into platelet-shaped substrates,
(e) coating the platelet-shaped substrates with at least one coating of semitransparent metal and/or at least one high-index coating having a refractive index $\geq 2.0$.

Preferred developments of the invention are specified in dependent claims 41 to 46.

DETAIL DESCRIPTION

A mixed inorganic/organic phase in accordance with the invention means that at least one inorganic component and at least one organic component are present together in the substrate, and are preferably at least partly covalently bonded to one another.

"At least one side" means at least the top face or bottom face of the platelet-shaped substrate.

A "high-index coating" means a coating composed of a material of high refractive index.

Within the mixed inorganic/organic phase, the organic components are present preferably in the manner of a network and/or in the form of a matrix. In one version according to the invention, the inorganic components as well are present in the manner of a network or in the form of a matrix. The networks and/or matrices formed from organic components and inorganic components in each case are mutually interpenetrating in one preferred embodiment.

The inorganic component, preferably inorganic oxide component, may also be present in particulate form, preferably in the form of nanoscale particles, and may be embedded in or at least partly covalently connected to an organic and/or inorganic/organic component. The preferably nanoscale particles of the inorganic component may also be in contact with one another and be present, for example, in the form of chains or grape-like clusters.

It has emerged, surprisingly, that platelet-shaped substrates which in addition to an organic fraction also possess a fraction of organic component have surprising materials properties.

Effect pigments produced using these substrates with mixed inorganic/organic phase are mechanically stable, and yet, in use, do not result in instances of abrasion or damage to, for example, pipelines in painting lines or in spray nozzles, as is conventionally the case; in other words, the extent of instances of abrasion or damage is significantly reduced. Preferably there are no marked instances of abrasion or damage.

It is thought that the organic-chemical fraction in the mixed inorganic/organic phase endows the substrates with a certain "softness" or elasticity or flexibility, which removes, from the effect pigments produced using these platelet-shaped substrates, the hardness and hence the deleterious highly abrasive properties of conventional effect pigments.

Especially when inorganic particles are embedded into an organic-chemical or largely organic-chemical matrix or inorganic/organic matrix, a substrate is obtained which exhibits a significant elasticity or flexibility in conjunction with outstanding mechanical stability, such as abrasion resistance, for example. The effect pigments of the invention that are produced on the basis of these substrates likewise possess, surprisingly, a desired "softness" or elasticity or flexibility.

In one preferred embodiment of the invention, the at least one mixed phase at least partly has an inorganic network that has one or more inorganic oxide components, and at least one organic component, with the proviso that the fraction of the organic component is 2% to 98% by weight, based on the weight of the total mixed inorganic/organic phase. It is further preferred for the fraction of the organic component to be situated in a range from 5% to 95% by weight, more preferably from 10% to 90% by weight, even more preferably in the range from 20% to 80% by weight, based in each case on the weight of the total mixed inorganic/organic phase.

Below 2% by weight of the organic component, the advantageous, i.e., elasticity-enhancing effects of the organic oligomer and/or polymer are barely effective. On the other hand, above 98% by weight of organic fraction in the mixed phase, the advantageous, i.e., abrasion resistance enhancing, effects of the inorganic component are lost. Moreover, these substrates are then difficult to coat with metal oxides and/or semitransparent metal layers.

These amounts of the organic components can be determined analytically in a simple way on the basis of the C content of the effect pigment.

The platelet-shaped substrate is composed preferably of a mixed inorganic/organic phase. In the text below, the terms mixed organic/inorganic phase and mixed phase are used interchangeably, unless indicated otherwise. It is preferred for the mixed inorganic/organic phase and/or the platelet-shaped substrate comprising or composed of the mixed inorganic/organic phase to have a refractive index of $\leq 1.8$, more preferably <1.7, still more preferably <1.6.

In another preferred embodiment, the mixed inorganic/organic phase and/or the platelet-shaped substrate comprising or composed of the mixed inorganic/organic phase has a refractive index of >1.8, more preferably >2.0, more preferably still >2.2. This is the case in particular on filling with high-index metal oxide nanoparticles such as $TiO_2$, $ZrO_2$, $Fe_2O_3$. In that case the sequence of a subsequent coating is preferably first of all low-index.

It is also preferred for the organic component in the platelet-shaped substrate to be an organic oligomer and/or polymer.

In one preferred development of the invention, inorganic oxide network and organic oligomer and/or polymer are connected to one another at least partly covalently via at least one organic network former. This is a reagent which is able to attach both to the inorganic network and to the organic oligomer and/or polymer.

In one preferred embodiment the at least partly covalent bonding of inorganic component, preferably inorganic oxide component, and organic oligomer and/or polymer is accomplished at least partly through one or more organic network formers, the organic network former preferably having the general formula (I)

where X is a hydrolyzable group after whose hydrolysis a covalent bond of organic network former to the inorganic network can be formed
and $R^1$ is a reactive organic group which is covalently bondable to the organic oligomer and/or polymer,
$R^2$ and $R^3$ independently of one another are each an organic group which may be covalently bondable to the organic oligomer and/or polymer,
with the proviso that
n, m and o are integers, with n+m+o=1-3 and n=1 to 3, m=0 to 2, and o=0 to 2,
and/or the general formula (II)

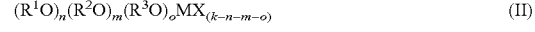

where the organometallic compound has at least one hydrolyzable group X after whose hydrolysis a covalent bond of organic network former to the inorganic network can be formed, at least one organic radical $R^1$ which is a reactive organic group which is covalently bondable to the organic oligomer and/or polymer, and $R^2$ and $R^3$ independently of one another may each be an organic group which may be covalently bondable to the organic oligomer and/or polymer, where
k is the formal oxidation number of M,
M is Al, Zr or Ti,
n is an integer from 1 to (k-1),
m is an integer from 0 to (k-2),
o is an integer from 0 to (k-2), and
where n+m+o is an integer from 1 to k-1.

By formal oxidation number is meant, in accordance with the invention, that aluminum can have the oxidation number III, zirconium the oxidation number II, III or IV, and titanium the oxidation number II, III or IV. Preferably both zirconium and titanium have the oxidation number IV.

Preferably the organic network former possesses the general formula (II), where the hydrolyzable group(s) X independently of one another are selected from the group consisting of halogen, hydroxyl, alkoxy having 1-20 C atoms, which may be straight-chain or branched, and may have heteroatoms, preferably O, S and/or N, in the carbon chain, and mixtures thereof.

According to one preferred development of the invention the reactive group $R^1$ or the reactive organic radical $R^1$ is polymerizable. The radical $R^1$ may be polymerizable, for example, with further radicals $R^1$, so that the organic network former can be present as such in an oligomerized or polymerized form in the mixed inorganic/organic phase. Alternatively the radical $R^1$ may be polymerizable with other monomers, so that the organic network former may be present in the mixed inorganic/organic phase in copolymerized form, in a polymer also constructed from further monomers.

Particularly preferred as organic network formers are organofunctional silanes. They are able, after the hydrolysis of the hydrolyzable group X, to attach to the inorganic network. As a result of the hydrolysis, the group X is generally replaced by an OH group, which then condenses with OH groups of the inorganic network to form a covalent bond. The group X here stands preferably for halogen, hydroxyl, alkoxy having 1-10 C atoms, which may be straight-chain or branched, may have in the carbon chain, and mixtures thereof.

The organic network former attaches at least via the functional group $R^1$ with or to the organic oligomer and/or polymer. $R^1$ is preferably a reactive functional group.

The reactive, preferably polymerizable, organic radical $R^1$ preferably has one or more substituents selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, and carbamate group, and mixtures thereof. The organic radical $R^1$ is preferably connected to the central silicon atom via a covalent C-Si bond.

The radicals $R^2$ and $R^3$ independently of one another are selected from the group consisting of H—, $(C_1$-$C_{40})$-alkyl-, $(C_1$-$C_{40})$-fluorinated alkyl-, $(C_1$-$C_{40})$-partially fluorinated alkyl-; $(C_2$-$C_{40})$-alkenyl-, $(C_2$-$C_{40})$-alkynyl-; $(C_6$-$C_{36})$-aryl-, fluorinated $(C_6$-$C_{36})$-aryl-, partially fluorinated $(C_6$-$C_{36})$-aryl-; $(C_7$-$C_{40})$-alkylaryl-, $(C_7$-$C_{40})$-arylalkyl-, fluorinated $(C_7$-$C_{40})$-alkylaryl-, partially fluorinated $(C_7$-$C_{40})$-alkylaryl-; $(C_8$-$C_{40})$-alkenylaryl-, $(C_8$-$C_{40})$-arylalkynyl-, $(C_8$-$C_{40})$-alkynylaryl-; $(C_5$-$C_{40})$-cycloalkyl-, $(C_6$-$C_{40})$-alkylcycloalkyl-, $(C_6$-$C_{40})$-cycloalkylalkylsilanes each of which may be substituted by amino, hydroxyl, thiol, epoxy, acrylate, methacrylate, vinyl, allyl, alkenyl, alkynyl, carboxyl, carboxylic anhydride, isocyanate, cyanate, ureido, carbamate and/or ester group and may contain O, N, and S as heteroatoms in the carbon chains and carbon ring systems. The radicals $R^2$ and $R^3$ preferably have chain lengths with 3 to 20 carbon atoms, more preferably with to 18 carbon atoms. The radicals $R^2$ and $R^3$ may be branched and/or linear. In the case of alkyl chains, these chains may be interrupted by heteroatoms such as O, S or N.

The organic group or the radical $R^1$ in any case has a reactivity which allows covalent bonding of the organic oligomer and/or polymer.

The organic groups or radicals $R^2$ and/or $R^3$ may also have a reactivity which allows covalent bonding of the organic oligomer and/or polymer. In contrast to the organic group $R^1$ or the radical $R^1$, however, it is not necessary for a covalent bond to the organic oligomer and/or polymer to form between the radicals $R^2$ and/or $R^3$. Accordingly the radicals $R^2$ and/or $R^3$ may also be nonreactive. More particularly the radicals $R^2$ and $R^3$ are preferably nonpolymerizable under the applied reaction conditions. Thus it is preferred for the radicals $R^2$ and $R^3$, in contrast to the radical $R^1$, to be unable to polymerize with one another and, more particularly under the applied reaction conditions, to be unable to react with monomers to form a polymer.

Suitable organofunctional silanes are, for example, numerous representatives of the products produced by Degussa (Untere Kanalstrasse 3, D-79618 Rheinfelden) and sold under the trade name "Dynasylan". For example, 3-methacryloyloxypropyltrimethoxysilane (Dynasylan MEMO) can be used to construct a (meth)acrylate or polyester, vinyltri(m) ethoxysilane (Dynasylan VTMO or VTEO) to construct a vinyl polymer, 3-mercaptopropyltri(m)ethoxysilane (Dynasylan MTMO or 3201) for polymerizational incorporation into rubber polymers, aminopropyltrimethoxysilane (Dynasylan AMMO) or N2-aminoethyl-3-aminopropyltrimethoxysilane (Dynasylan DAMO) to construct a β-hydroxyamine, or 3-glycidyloxypropyltrimethoxysilane (Dynasylan GLYMO) to construct a urethane or polyether network.

Further examples of silanes with vinyl and/or (meth)acrylate functionalities are as follows: isocyanatotriethoxysilane, 3-isocyanatopropoxytriethoxysilane, vinylethyldichlorosilane, vinylmethyldichlorosilane, vinylmethyldiacetoxysilane, vinylmethyldiethoxysilane, vinyltriacetoxysilane, vinyltrichlorosilane, phenylvinyldiethoxysilane, phenylallyldiethoxysilane, phenylallyldichlorosilane, 3-methacryloyloxypropyltriethoxysilane, methacryloyloxypropyltrimethoxysilane, 3-acryloyloxypropyltrimethoxysilane, 2-methacryloyloxyethyltri(m)ethoxysilane, 2-acryloyloxyethyltri(m)ethoxysilane, 3-methacryloyloxypropyltris(methoxyethoxy)silane, 3-methacryloyloxypropyltris(butoxyethoxy)silane, 3-methacryloyloxypropyltris(propoxy)silane, 3-methacryloyloxypropyltris(butoxy)silane.

Additionally it is possible with advantage to use what are known as α-silanes, as produced and sold by Wacker, Burghausen, Germany. In these silanes, the reactive organic groups are separated from the Si atom by one methylene unit only. Relative to conventional silanes, they feature accelerated hydrolysis and condensation rates.

As organic network formers it is also possible to use suitable organofunctional titanates, zirconates or aluminates, of the kind produced, for example, by Kenrich Petrochemicals and offered under the trade name Ken-React® (purchasable from Nordmann, Rassmann GmbH, Kajen 2, 20459 Hamburg). More particularly the coupling reagents given in the KEN-REACT® Reference Manual Titanate, Zirconate and Aluminate Coupling Agents, $2^{nd}$ revised edition, Summer 1993, on pages 2 to 21 can be used for the most part as organic network formers. The disclosure content of pages 2 to 21 of the aforementioned KEN-REACT® Reference Manual is hereby incorporated by reference.

The hydrolyzable or condensable group X of these organic network formers is preferably alkoxy, but alternatively hydroxyl or halogen. In the case of alkoxy it is also possible for there to be a cyclic group attached via two oxygen atoms to the central atom M, such as oxoethylene or cycloneopentyl, for example. In this case the central atom M has only two further substituents. The hydrolyzable group may also be part of a cyclic unit attached coordinatively via further oxygen atoms to the central atom, and hence may not be eliminated from the molecule after hydrolysis.

In the case of further forms there may be two organophosphito ligands bonded coordinatively to the central atom. In this case there are four alkoxy ligands attached to the central atom.

These Al—, Zr— or Ti-organic network formers may be present in the form of chelate complexes or coordination complexes. The ligands in that case may contain heteroatoms, preferably N, S or O.

Examples of such organic network formers are (see KEN-REACT® Reference Manual—Titanate, Zirconate and Aluminate Coupling Agents by Salvatore J. Monte): isopropyldimethacryloylisostearoyltitanate(IV) (KR7), alkoxytrimethacryloyltitanate (KR 33DS), isopropyltri-(N-ethylenediamino)ethyltitanate(IV) (KR 44), tris-(2-propenoato-0)methoxydiglycolylotititanate (KR 39DS), methacrylatotriisopropoxytitanate, methacryloyloxyethylacetoacetonatotriisopropoxytitanate, (2-methacryloyloxyethoxy)triisopropoxytitanate, titanium (IV) 2,2(bis2propenolatomethyl)butanolatotris(dioctyl)pyrophosphato-0 (LICA 38J), methacryloyloxyethylacetoacetonatotri-n-propoxyzirconate, neopentyl(diallyl)oxytri(N-ethylenediamino)ethylzirconate(IV) (NZ 44), 9-octadecenylacetoacetatodiisopropoxyaluminate.

The inorganic component of the mixed phase is preferably composed of metal oxide and/or metal oxide hydrate and/or metal suboxide and/or metal hydroxide, at least partially forming a two- or three-dimensional network with one another.

The inorganic fraction of the mixed phase of metal oxide and/or metal suboxide and/or metal hydroxide is preferably selected from the following group: silicon, aluminum, titanium, zirconium, cerium, chromium, manganese, antimony, zinc, boron, magnesium, and iron, and their mixtures and alloys.

As starting compounds which act as inorganic network formers of these oxides it is preferred to use alkoxides, hydroxides, and halides of these compounds.

The inorganic network formers preferably possess the general formula $$MX_n$$

where X independently at each occurrence is an optionally hydrolyzable and/or condensable group from halogen, hydroxyl or alkoxy having 1-10 C atoms, it being possible for the alkoxy group in the carbon chain to have heteroatoms, preferably O, S and/or N, in the carbon chain.

The metal M is preferably Si, Al, Ti, Zr, B, Fe, Mg, Mn, Sb, Cr, Zn and/or Ce, with the proviso that,
if M is Sb(V),
n is 5 and,
if M is Si, Ti or Zr,
n is 4 and,
if M is Al, Ce, Fe(III), Sb(III) or B,
n is 3 and,
if M is Zn, Fe(II) or Mg,
n is 2.

Where M is Al, Ti, Zr or Fe it is also possible for X to stand for chelating ligands such as acetylacetonates or acetoacetic esters, for example.

It is preferred to use inorganic network formers in which M is Si, Al, Ti and/or Zr, and X is alkoxy groups having 1 to 6 C atoms, it being possible for the alkoxy group in the carbon chain to have heteroatoms, preferably O, S and/or N, in the carbon chain. It is particularly preferred to use tetraalkoxysilanes, more particularly tetramethoxy- and/or tetraethoxysilanes, to construct an $SiO_2$ layer.

It has emerged that it is advantageous if, when generating the inorganic network, as for example by hydrolysis of tetraethoxysilane, acrylosilane and acrylic monomer and/or methacrylic monomer are added. With this approach there is on the one hand a coupling of acrylosilane to the $SiO_2$ network which forms, and on the other hand a polymerization of acrylic monomer and/or methacrylic monomer, and also a polymerizational incorporation of the acrylic group of the acrylosilane into the acrylic oligomer and/or polymer and/or methacrylic oligomer and/or polymer constructed from acrylic monomers and/or methacrylic monomers.

If precipitation of metal oxide from suitable inorganic network former, in the production of the platelet-shaped substrate, is carried out in the presence of suitable monomers and, optionally, polymerization initiators and also organic network formers, then it is possible at the same time in a targeted way to form an inorganic oxide network and an organic oligomer and/or polymer. The inorganic network and the organic oligomers and/or polymers are preferably in mutual interpenetration.

In the case of one preferred development of the invention there is not only an inorganic network but also an organic network of oligomers and/or polymers, which are preferably in mutual interpenetration.

Depending on the reaction conditions, the proportions of the reactants used, and the kinetics of the reactions that take place, the mixed inorganic/organic phase may be substantially homogeneous. It is also possible, however, for there to be small regions of inorganic network only, or of organic oligomer and/or polymer only in the mixed phase.

By organic oligomers in the mixed phase are meant, in this invention, the concept which is customary in polymer chemistry: that is, the linking of two to twenty monomer units (Hans-Georg Elias, "Makro-moleküle", $4^{th}$ Edition 1981, Hüthig & Wepf Verlag, Basle). Polymers are linkages of more than twenty monomer units.

In view of the diversity of organic monomers and the use of different oxides or oxide mixtures, there is in principle a wide range of variation possibilities for the formation of a mixed inorganic/organic phase. Through the ratio of monomer concentration to the concentration of the organic network formers it is possible to vary the average chain length of the organic segments. Thus it is possible to produce mixed phases which endow the effect pigments with properties tailored in a multiplicity of respects. The average chain length of the organic segments is 2 to 10 000, preferably 4 to 5000, more preferably 10 to 1000, and very preferably 40 to 200 monomer units.

As organic component it is particularly preferred, furthermore, to use organic polymers having average chain lengths of 21 to 15 000, preferably of 50 to 5000, and more preferably of 100 to 1000 monomer units.

The organic oligomer and/or polymer in the mixed phase are/is constructed by scaffold molecules which are customary in organic polymer chemistry. These are, for example, C—C bonds, amines, esters, acrylates, etc. Not used are siloxanes, since silane radicals of the network formers serve to link the inorganic network to the organic network. Moreover, the desired mechanical flexibility of the mixed phase is achieved preferably only through the incorporation of organic scaffold molecules.

The organic oligomer and/or polymer in the mixed phase may preferably be constructed by polymerization of suitable monoers. The monomers may have functionalities selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, carbamate, and ester group, and mixtures thereof.

In one preferred development of the invention, the organic component is constructed from reactive organic oligomers and/or polymers which have reactive groups which are able to attach to the inorganic network and/or at least to the group $R^1$ of the organic network formers.

It is preferred for the reactive organic oligomer and/or polymer to be selected from the group consisting of trialkoxysilane-modified polyethyleneimines, and aminosilane-modified polyethylene oxide urethanes, and mixtures thereof.

In one preferred embodiment the mixed inorganic/organic phase is implemented using organic network formers for the covalent linking of organic and inorganic networks and through polymerization of organic monomers. Particular preference is given to using silanes containing (meth)acrylate functions, such as Dynasylan MEMO, for example, as organic network formers, and methacrylates as monomers.

Suitable as monomers or reactive oligomers or polymers are, more particularly, crosslinking (meth)acrylates, i.e., polyfunctional (meth)acrylates. Examples of such compounds are:

tetraethylene glycol diacrylate (TTEGDA), triethylene glycol diacrylate (TIEGDA), polyethylene glycol-400 diacrylate (PEG400DA), 2,2'-bis(4-acryloyloxyethoxyphenyl)propane, ethylene glycol dimethacrylate (EGDMA), diethylene glycol dimethacrylate (DEGDMA), triethylene glycol dimethacrylate (TRGDMA), tetraethylene glycol dimethacrylate (TEGDMA), butyl diglycol methacrylate (BDGMA), trimethylolpropane trimethacrylate (TMPTMA), 1,3-butanediol dimethacrylate (1,3-BDDMA), 1,4-butanediol dimethacrylate (1,4-BDDMA), 1,6-hexanediol dimethacrylate (1,6-HDMA), 1,6-hexanediol diacrylate (1,6-HDDA), 1,12-dodecanediol dimethacrylate (1,12-DDMA), neopentyl glycol dimethacrylate (NPGDMA).

Particular preference is given to trimethylolpropane trimethacrylate (TMPTMA).

These compounds are available commercially from Elf Atochem Deutschland GmbH, D-40474 Düsseldorf, Germany, or Rohm & Haas, In der Kron 4, 60489 Frankfurt/Main, Germany.

Noncrosslinking (meth)acrylates can also be used as monomers for constructing the organic component, i.e., the organic oligomer and/or polymer, of the mixed phase. Depending on further functional groups of these (meth)acrylates it is possible in turn to enable a very wide diversity of variation possibilities for the chemical composition and hence also for the performance properties of the effect pigments produced using a mixed phase as platelet-shaped substrate. Also suitable are mixtures of crosslinking and monofunctional vinyl and/or (meth)acrylate monomers.

Examples of monofunctional (meth)acrylates are: lauryl (meth)acrylate, allyl (meth)acrylate, propyl (meth)-acrylate, isobornyl methacrylate, and hydroxyethyl-imidazoline methacrylate.

These compounds are likewise available commercially from Elf Atochem Deutschland GmbH, Uerdingerstr. 4 D-40474 Düsseldorf or from Rohm & Haas, In der Kron 4, 60489 Frankfurt/Main, Germany The polymerization of vinyl-functional and/or (meth)-acrylate-functional monomers when constructing the mixed inorganic/organic phase can be accomplished by thermal polymerization. Preference is given to the use of polymerization initiators, preferably free-radical initiators. These are commercially customary, generally organic or inorganic peroxides or diazonium compounds. Examples of such compounds are:

acetyl cyclohexanesulfonyl peroxide, bis(2,4-dichlorobenzoyl) peroxide, diisononanyl peroxide, dioctanoyl peroxide, diacetyl and dibenzoyl peroxide; peroxydicarbonates (e.g., diisopropyl peroxydicarbonate, di-n-butyl peroxydicarbonate, di-2-ethylhexyl peroxydicarbonate, dicyclohexyl peroxydicarbonate), alkyl peresters (e.g., cumyl perneodecanoate, t-butyl perneodecanoate, t-amyl perpivalate, t-butyl per-2-ethylhexanoate, t-butyl perisobutyrate, t-butyl perbenzoate), dialkyl peroxides (e.g., dicumyl peroxide, t-butyl cumyl peroxide, 2,5-dimethylhexane-2,5-di-t-butyl peroxide, di(t-butylperoxyisopropyl)benzene, di-t-butyl peroxide, or 2,5-dimethylhex-3-yne-2,5-di-t-butyl peroxide), perketals (e.g., 1,1'-bis(t-butyl-peroxy)-3,3,5-trimethylcyclohexanone peroxide, methyl isobutyl ketone peroxide, methyl ethyl ketone peroxide, acetylacetone peroxide), alkyl hydroperoxides (e.g., pinane hydroperoxide, cumene hydroperoxide, 2,5-dimethylhexane-2,5-dihydroperoxide or t-butyl hydroperoxide), azo compounds (e.g., 4,4'-azobis(4-cyanovaleric acid), 1,1'-azobis(cyclohexanecarbonitrile), 1,1'-azo-bis(isobutyroamidine)dihydrochloride, 2,2'-azobis-(isobutyronitrile), or persulfates such as sodium peroxodisulfate and potassium peroxodisulfate. Preference is given to 2,2'-azobis(isobutyronitrile).

These compounds are available commercially from Aldrich Chemie, D-89552, Steinheim.

The polymerization of vinyl-functional and/or (meth)-acrylate-functional monomers when constructing the mixed inorganic/organic phase may also be carried out, furthermore, by an ATRP (atomic transfer radical polymerization), the so-called living free-radical polymerization. Here the organic network former used is preferably a silane compound in which $R^1$ has been provided terminally with an alkyl halide, preferably an alkyl bromide with an ester group in $\alpha$ position. Also added in this case are Cu(I) salts, optionally in a mixture with Cu(II) salts or metallic Cu, and also suitable ligands which complex the copper compounds. Further details on this are found in DE 198 38 241 A1.

When epoxysilanes are used as organic network formers, they can be reacted with polyfunctional amines as crosslinkers. Further variation possibilities are also obtained when using polyfunctional epoxy compounds.

Combinations of polyfunctional epoxy compounds and polyfunctional amino compounds may of course also be used when using amino-functional silanes as coupling reagents.

Examples of polyfunctional amines suitable for such reactions and available commercially include the following: 3,3-dimethyl-4,4-diaminodicyclohexylmethane, ethylenediamine, triethylenetetramine, meta-xylylenediamine, N-aminoethylpiperazine, 2-methyl-1,5-penta-methylenediamine, 1,2-diaminocyclohexane or isophoronediamine.

Examples of suitable polyfunctional epoxy compounds available commercially include the following: 1,4-butanediol diglycidyl ether, glycerol triglycidyl ether, neopentyl glycol diglycidyl ether, penta-erythritol polyglycidyl ether, 1,6-hexanediol diglycidyl ether, polypropylene glycol diglycidyl ether or trimethylolpropane triglycidyl ether.

All these polyfunctional amines and epoxy compounds are available commercially from the company UPPC: (U. Prümmer Polymer-Chemie GmbH; Mühlhalde 8 in D-88487 Baltringen).

In a further embodiment of the invention the organic network is not prepared during the reaction. Instead the organic component used comprises reactive organic oligomers and/or polymers which possess reactive groups which permit attachment to the oxide network via the at least one group $R^1$ of the organic network formers. In order to ensure an effective reaction with, more particularly, the group $R^1$ of the organic network formers, the oligomer and/or polymer can also be reacted directly with the organic network former before incorporation into the mixed phase. For that purpose the oligomers and/or polymers are dissolved in a suitable solvent, organic network formers are added, and the components are reacted. The organic oligomers and/or polymers coupled with the organic network former can then be reacted with the metal oxide-forming compounds used to generate the inorganic network, to form the mixed inorganic/organic phase.

Examples of reactive organic oligomers and/or polymers which can be incorporated directly into the inorganic network that forms, during the reaction, include the following: silane-modified polyethyleneimines or polybutadienes, or aminosilane-modified polyethylene oxide urethanes. For these compounds, particularly low molecular weights of 100 to 1000 g/mol are preferred. Low molecular weight compounds of this type have a particularly large number of linkage sites to the inorganic oxide network, and so produce more homogeneously distributed mixed inorganic/organic phases.

Examples of commercially available compounds of this kind are:
trimethoxysilylpropyl-substituted polyethyleneimine, dimethoxymethylsilylpropyl-substituted polyethyleneimine, triethoxysilyl-modified polybutadienes, dimethoxymethylsilyl-modified polybutadienes, (N-triethoxysilylpropyl)-O-polyethylene oxide urethane, and poly(trimethylsilylpropyne) (all available from, for example, ABCR GmbH & Co. Postfach 210135, Hansastr. 29c, D-76151 Karlsruhe, Germany). A further example are silane-modified phenol-formaldehyde oligomers, of the kind produced and sold as resoles or novolaks by Bakelite AG (Gennaer Straβe2-4, D-58642 Iserlohn-Letmathe).

In a further embodiment of the invention it is also possible as reactive oligomers and/or polymers to use compounds which possess reactive, preferably polymerizable, functional groups. The polymerizable functional groups can be prepared, for example, by a subsequent reaction of the oligomer and/or polymer (as for example by means of a polymer-analogous reaction). These reactive oligomers/polymers react with the functional organic groups of suitable organic network formers and in that way are bonded covalently to or in the inorganic oxide network.

These reactive oligomers and/or polymers may be reactive polymers from the group of the polyacrylates, polymethacrylates, polyethers, polyesters, polyamines, polyamides, polyols, polyurethanes, and polyolefins.

Organic oligomers and/or polymers which can be incorporated via suitable functional groups directly into the mixed phase are preferably those which possess polymer-chemically compatible functional groups to those of the organic network formers. Thus, in the case of a silane containing epoxy groups, use is made of an epoxy resin or an amino-containing resin; in the case of silanes containing (meth) acrylic groups, use is made of (meth)acrylates, etc. Where the reaction of the functional groups of the organic oligomers/polymers with the reactive groups $R^1$ of the organic network formers takes place by way of condensation mechanisms or addition mechanisms, the functional groups are preferably matched to one another accordingly. For example, epoxide-containing polymers can be reacted particularly well with epoxy-functionalized or amino-functionalized silanes. In this way the polymers are modified by alkoxysilanes and hence can be reacted very well together with, for example, tetraalkoxysilanes to give mixed inorganic/organic phases.

Examples of prepolymers/preoligomers which can be used in this way are the epoxy resin D.E.R: 330 (Dow Corning; Rheingaustr. 53 in D-65201 Wiesbaden, Germany) and also polybutadiene-poly(2,3-epoxy)butadiene copolymer (available from Aldrich, D-89552 Steinheim, Germany).

In a further preferred embodiment of the invention the formation of organic oligomer and/or polymer takes place within an inorganic oxide, by causing only the functional groups of the organic network formers to polymerize specifically with one another. In this way, for example, network formers in which the polymerizable group $R^1$ are methacrylate, acrylate or vinyl groups can be oligomerized or polymerized by addition of suitable polymerization initiators.

It is also possible for epoxide-containing silanes, for example, prior to incorporation into an oxide network, in a separate step, to react with one another to form oligomeric/polymeric polyether units, for example. A mixture of suitable epoxy-functionalized and amino-functionalized silanes can react at least partly, prior to incorporation into the mixed inorganic/organic phase, for example, to form oligomeric/polymeric β-hydroxyamines, and in this way may already form a quasi-two-dimensional organic network.

These silane mixtures may, after oligomerization and/or polymerization then be reacted with the resultant oxide network to form a mixed inorganic/organic phase.

Mixed inorganic/organic phases formed in this way preferably have a lower degree of polymerization in the context of the organic component than if, additionally, organic monomers are copolymerized, i.e., are added additionally during the polymerization.

Preference is therefore given, in a further embodiment of the invention, to the additional use of organic monomers to construct the organic network.

The average thickness of the mixed phase is preferably at least 20 nm, more preferably at least 40 nm, and very preferably at least 80 nm. Below 20 nm, the optical mode of action is too small, i.e., there are virtually no interference effects after coating has taken place with high-index metal oxides.

The mechanical stabilization of the effect pigments of the invention, based on the substrate comprising a mixed inorganic/organic phase, exists even still at very high mixed-phase thicknesses. The average thickness of the mixed inorganic/organic phase or of the substrate is typically located within a range from about 20 nm to 5000 nm, preferably from 50 to 1000 nm, more preferably 100 to 300 nm.

Viewed over the thickness of the mixed phase, the two components of the mixed inorganic/organic phase of the substrate may be present in homogeneous distribution or else in inhomogeneous distribution, such as, for example, in the form of a gradient distribution, such that the proportion of the two components alters along the thickness of the mixed phase. In the case of inhomogeneous distribution of the individual components, the abovementioned limits to the composition of the mixed phase apply for the average value along the thickness of the mixed phase. In accordance with the invention, however, a substantially homogeneous, and preferably homogeneous, distribution of inorganic network and organic oligomer and/or polymer is preferred.

The organic oligomers and/or polymers may for example also be present at least partly in the form of nanoparticles in the inorganic network, to form the mixed inorganic/organic phase.

In one preferred embodiment, the inorganic component, preferably in the form of inorganic oxide component, is present at least partly in the form of nanoparticles in the organic oligomer and/or polymer, to form the mixed inorganic/organic phase.

In accordance with a further variant of the invention the mixed inorganic/organic phase has a substantially homogeneous construction, and the inorganic nano-particles are present in a substantially organic environment of oligomer and/or polymer, or organic nanoparticles in the form of oligomer and/or polymer in an inorganic environment, in homogeneous distribution. A homogeneous construction is obtained in particular when using a high fraction of organic network formers when producing the mixed inorganic/organic phase.

The preferably transparent, platelet-shaped mixed inorganic/organic phase or the platelet-shaped substrate with the mixed inorganic/organic phase is preferably low-index, with low-index referring to a refractive index<1.8.

The substrates with mixed inorganic/organic phase that are used in the context of the present invention preferably have a standard deviation with regard to the average thickness distribution that is less than 20%, more preferably less than 15%, and with particular preference less than 10%. The substrates used in the context of the present invention possess particularly smooth surfaces. With these substrates, therefore, it is possible to produce particularly intensely colored effect pigments with strong color flops.

Preference is given in accordance with the invention to platelet-shaped substrates having an average thickness of 20 to 5000 nm, more preferably of 25 to 1000 nm, with particular preference of 30 to 500 nm, and, with even more particular preference, of 40 to 350 nm. Such thin platelet-shaped substrates are especially suitable for automotive applications, since in that case the thicknesses of the basecoat layers are very low (12-15 µm) and the trend is toward even lower layer thicknesses. Such thin substrates are a prerequisite for relatively thin effect pigments which are able to undergo optimum orientation even in such thin finish systems. Optimally oriented pigments also result in optimum optical properties such as, for example, gloss and color flop.

Atop these—preferably low-index—platelet-shaped, transparent substrates, featuring or comprising mixed inorganic/organic phase, high-index layers are deposited. Layers of this kind are selected preferably from the group consisting of metal chalcogenides, more particularly metal oxides, metal hydroxides, metal oxide hydrates, metal suboxides, and metal sulfides, metal fluorides, metal nitrides, metal carbides, and mixtures thereof.

Preferably at least one high-index coating is applied to at least one side of the platelet-shaped substrate. The high-index coating, preferably metal oxide layer and/or metal hydroxide layer and/or metal oxide hydrate layer, has a refractive index $n \geq 2.0$. The platelet-shaped substrate featuring or comprising mixed inorganic/organic phase is preferably coated envelopingly with a high-index coating, preferably a metal oxide layer and/or metal hydroxide layer, having a refractive index $n \geq 2$.

"Envelopingly" for the purposes of the invention means that not only the top face and the bottom face but also the side edges of the platelet-shaped substrate are coated.

The platelet-shaped substrates featuring or comprising mixed inorganic/organic phase, for the purpose of producing effect pigments, are preferably coated with a multilayer coat system featuring or comprising high-index metal oxide, metal hydroxide, metal suboxide and/or metal oxide hydrate, the sequence of the layers being variable. The metal oxides, metal hydroxides, metal suboxides and/or metal oxide hydrates may also be present alongside one another in the same layer.

In order to produce, for example, a good pearl luster effect, the refractive index of the high-index metal oxide layer and/or metal hydroxide layer is greater than 2.0, preferably greater than 2.2, more preferably greater than 2.3, more preferably still greater than 2.4, and with particular preference 2.5 or more.

For the purpose of producing effect pigments, such as pearlescent pigments, for example, the platelet-shaped substrates featuring or comprising mixed inorganic/organic phase are coated preferably with one or more high-index metal oxide layers from the group consisting of or comprising $TiO_2$, $Fe_2O_3$, $Fe_3O_4$, $TiFe_2O_5$, ZnO, $SnO_2$, CoO, $Co_3O_4$, $ZrO_2$, $Cr_2O_3$, $VO_2$, $V_2O_3$, $(Sn,Sb)O_2$, and mixtures thereof. Particular preference is given to $TiO_2$ and/or $Fe_2O_3$. Particular preference is given to $TiO_2$ in the rutile modification.

The titanium oxide is preferably used in the rutile, anatase and/or pseudobrookite modification in the high-index metal oxide layers.

The iron oxide is used preferably in the hematite, goethite and/or magnetite modification in the high-index metal oxide layers.

In another embodiment of the invention, the multilayer construction has a layer sequence in which at least one high-index layer and at least one low-index layer are arranged in alternation on the substrate (so-called multilayer system).

In the case of the alternating arrangement it is also possible for one or more high-index layers to be arranged directly above one another and, thereafter, for one or more low-index layers to be arranged directly above one another. What is essentially, however, is that there are high-index and low-index layers in the layer construction.

It is preferred for the multilayer construction to have a layer sequence in which at least one high-index layer, at least one low-index layer, and at least one high-index layer are arranged in succession on the substrate core.

With this version as well it is possible for one or more low-index or high-index layers to be arranged in each case directly above one another. What is essential, however, is that within the layer structure, from inside to outside, there are high-index and low-index and once again high-index layers arranged.

The at least one high-index layer preferably consists of or comprises metal oxide and/or metal hydroxide from the group consisting of $TiO_2$, $Fe_2O_3$, $Fe_3O_4$, $TiFe_2O_5$, ZnO, $SnO_2$, CoO, $Co_3O_4$, $ZrO_2$, $Cr_2O_3$, $VO_2$, $V_2O_3$ $(Sn,Sb)O_2$, and mixtures thereof. The low-index layer preferably consists of or comprises metal oxide and/or metal hydroxide from the group consisting of $SiO_2$, $Al_2O_3$, $B_2O_3$, and mixtures thereof.

Effect pigments with high-index and low-index layers produce particularly intense interference colors. More particularly, effect pigments such as pearlescent pigments having a high-index and a low-index, and again a high-index layer are particularly preferred. A layer sequence featuring or comprising $TiO_2/SiO_2/TiO_2$ and optionally a further layer with $Fe_2O_3$ may give rise to intense gold hues, and is particularly preferred.

In another embodiment the platelet-shaped substrates featuring or comprising mixed inorganic/organic phase are coated on at least one side, more preferably on both sides, and even more preferably envelopingly, with at least one semitransparent metal layer.

The metals of the semitransparent metal layers are selected preferably from the group consisting of silver, aluminum, chromium, titanium, nickel, gold, platinum, palladium, copper, zinc, iron, their mixtures and their alloys. The thicknesses of the semitransparent layers are situated preferably in a range from about 2 to about 30 nm, more preferably from about 5 to about 20 nm.

In the present invention, semitransparent metal layers preferred for coating the substrate composed of or featuring the above-described mixed inorganic/organic phase are silver or chromium.

The semitransparent metal layers may be applied by any common methods, such as wet-chemical electroless deposition, CVD or PVD methods, to at least one side of the substrate comprising a mixed inorganic/organic phase.

Also encompassed by the present invention are multi-layer interference pigments, of the kind described in DE 19618569, for example, comprising a substrate featuring or comprising mixed inorganic/organic phase, coated with alternating layers of metal oxides of low and high refractive index.

Platelet-shaped substrates are those having a form factor (ratio of the average of the longitudinal extent to the thickness) of 3 to 10 000, preferably of 5 to 5000, and very preferably of 10 to 4500.

The size relationships of the platelet-shaped substrates are characterized by the average ($d_{50}$ value) of the cumulative distribution curve, of the kind typically measured by laser diffraction methods. Preference is given in this context to sizes having a $d_{50}$ of 0.5 to 2000 µm, more preferably of 1 to 1000 µm and with very particular preference of 1.5 to 300 µm. Specifically, the size of the platelet-shaped substrate is dependent on the field of the application and on the desired effect, and can be selected accordingly by the skilled worker.

In a further development in accordance with the invention the organically/inorganically modified mixed phase is additionally modified through the use of network modifiers. In contrast to the organic network formers, network modifiers do not form organic oligomers/polymers, and polymerize neither with added organic monomers nor with one another.

Organic network modifiers are reagents which contain not only at least one hydrolyzable group but also at least one organic group, which need not necessarily, however, be reactive or polymerizable.

Organic network modifiers are preferably compounds of the general formula (III)

where X is a hydrolyzable group after whose hydrolysis a covalent bond of organic network modifier to the inorganic network can be formed,
and $R^1$, $R^2$, and $R^3$ independently of one another are each a nonreactive organic group, with the proviso
that n, m and o are integers, where n+m+o=1-3 and n=1 to 3, m=0 to 2, and o=0 to 2,
and/or of the general formula (IV)

where the compound has at least one hydrolyzable group X after whose hydrolysis a covalent bond of organic network modifier to the inorganic network can be formed, and has at least one nonreactive organic radical $R^4$, where
k is the formal oxidation number of M,
M is Al, Zr or Ti, and
p is an integer from 1 to (k-1).

The hydrolyzable or condensable group X of the organic network modifiers is preferably selected from the group consisting of halogen, hydroxyl or alkoxy having 1-10 C atoms, which may be linear or branched.

The organically functionalized groups $R^1$, $R^2$, and $R^3$ are preferably selected from the group consisting of H, alkyl, alkenyl, alkynyl, aryl, alkylaryl, arylalkyl, alkenylaryl, arylalkynyl, alkynylaryl, cycloalkyl, alkylcycloalkyl, cycloalkylalkyl, amino, hydroxyl, thiol, mercaptan, fluorinated alkyl, partly fluorinated alkyl, (partly) fluorinated aryl, (partly) fluorinated alkylaryl, acrylate, methacrylate, vinyl, epoxy, carboxyl, and ester group. The radicals $R^1$, $R^2$, and $R^3$ preferably have chain lengths with 3 to 20 carbon atoms, more preferably with 5 to 15 carbon atoms. The radicals $R^1$, $R^2$, and $R^3$ may be cyclic, branched and/or linear and may contain heteroatoms such as O, S, and N in the carbon chain or in the carbon ring system. With regard to the length of the functional groups $R^1$, $R^2$, and $R^3$, reference is made accordingly to the observations relating to the organic network former.

The above-recited functionalities of the organic network modifiers are in some cases identical with those also used as organic network formers. The difference is that in this case the functionalities are not intended to react with one another or with organic monomers or polymers. This is the case when, in terms of their chemical reactivity, the functionalities of $R^1$, $R^2$, and $R^3$ are different from the functionalities of the monomers or else from those of the organic oligomers and/or polymers. Accordingly, through a choice of network modifier and suitable monomers, the reaction can be controlled in such a way that there is no reaction of network modifiers with one another or with the monomers.

If, for example, exclusively a mixture of organofunctional silanes is used to construct the organic component, i.e., the organic oligomer and/or polymer, of the mixed phase, then all organofunctional silanes whose functional groups do not react with one another function as organic network modifiers.

Organofunctional silanes suitable as pure organic network modifiers are, in particular, compounds without functionalities having pronounced chemical reactivity. These are, in particular, ($C_1$-$C_{40}$)alkyl, ($C_6$-$C_{36}$)aryl, and also perfluorinated or partly fluorinated ($C_1$-$C_{40}$)alkyl and/or ($C_6$-$C_{40}$)aryl functionalities as radicals $R^1$, $R^2$, and $R^3$. The alkyl radicals may be linear, branched or cyclic. Examples are:
propyltri(m)ethoxysilane, octyltri(m)ethoxysilane, dodecyltri(m)ethoxysilane, octadecyltri(m)ethoxysilane, phenyltri(m)ethoxysilane, diphenyldi(m)ethoxysilane, perfluorooctyltri(m)ethoxysilane, 1-,1-,2-,2-,3-,3-,4-,4-fluorooctyltri(m)ethoxysilane, 5-,5-,6-,6-,7-,7-,8-, 8-,8-fluorooctyltri(m)ethoxysilane, 1H-,1H-,2H-,2H-per-fluorooctyltriethoxysilane (Dynasylan F 8261).

Examples of network modifiers with Ti, Zr or Al as central atom are (see Ken-React Reference Manual—Titanate, Zirconate and Aluminate Coupling Agents by Salvatore J. Monte):
isopropyltriisostearyltitanate(IV) (KR TTS), isopropyl-tri(dioctyl)phosphatotitanate(IV) (KR 12), isopropyl-tri(dodecyl)benzenesulfonyltitanate(IV) (KR 9S), iso-propyltri(dioctyl)pyrophosphatotitanate(IV) (KR 38S), di(dioctyl)phosphatoethylenetitanate(IV) (KR 212), di(dioctyl)pyrophosphatoethylenetitanate(IV) (KR 238S), di(dioctyl)pyrophosphatooxoethylenetitanate(IV) (KR 138S), diisobutyl(stearyl)acetoacetylaluminate (KA 301).

In one preferred version of the invention the substrate comprising at least one mixed inorganic/organic phase comprises colored or colorless nanoscale particles of metal, metal oxide, metal sulfide, metal selenide, metal nitride or mixtures or core-shell particles thereof. The nanoparticles preferably have an average size (number average) in a range from 1 to 200 nm and more preferably from 1.5 to 100 nm, and with further preference from 2 to 50 nm. As set out above, the nanoscale particles may be present in an organic matrix or in an inorganic/organic matrix. The inorganic nanoparticles may have contact with one another, in which case, for example, chainlike and/or grapelike clusters may be formed.

The colored or colorless nanoscale particles are preferably selected from the group consisting of metal, metal oxide, metal sulfide, metal nitride, and mixtures and alloys and core-shell particles thereof.

In accordance with one development of the invention, the colored or colorless nanoscale particles of metal are selected from the group consisting of Au, Ag, Cu, Pt, Pd, Ni, Fe, and mixtures and alloys of these metals.

Particular preference in this context is given to Ag nanoparticles having an average size of 1 to 50 nm. These particles, on the basis of their extremely high absorption properties, give the substrate an intense yellow coloring. The coloring is still very pronounced even at low substrate layer thicknesses (<400 nm). This effect is very surprising, since to date the effective coloring of very thin substrates was not considered possible.

Furthermore, it is preferred to use gold particles having a size of 1 to 20 nm. The gold particles may also be present in agglomerated form, and, accordingly, it is possible to attain colors from red through violet.

The colored or colorless nanoscale particles may also be selected from metal oxide from the group consisting of oxides of the elements Si, Al, Zr, Ti, V, Mn, Co, Fe, Cr, Mo, W, Cu, Ag, Zn, Hf, Ta, In, Sn, Sb, lanthanides, actinides, and mixtures and mixed oxides thereof.

Furthermore, the colored or colorless nanoscale particles may also be selected from metal sulfide from the group consisting of CdS, PbS, $MoS_2$, CuS, AgS, ZnS, $In_2S_3$, $Sb_2S_3$, and mixtures and mixed sulfides thereof. Metal selenides such as CdSe or PbSe can also be used.

Core-shell particles are particles in which a core is surrounded by a shell comprising a material other than the core. Such core-shell particles have advantageous properties such as, among others, combination effects such as UV protection+ increased stability in aggressive media, e.g., $SiO_2$-encapsulated ZnO nano-particles (see WO 2005/019348, WO 2005/070820, and US 2004/0009349).

Core-shell particles contemplated include the following combinations:

| Core: | Shell: |
| --- | --- |
| Metal | Metal |
| Metal | Metal oxide or metal sulfide or metal selenide |
| Metal oxide | Metal |
| Metal sulfide | Metal |
| Metal selenide | Metal |
| Metal oxide | Metal oxide |
| Metal oxide | Metal sulfide |
| Metal oxide | Metal selenide |
| Metal sulfide | Metal sulfide |
| Metal sulfide | Metal oxide |
| Metal sulfide | Metal selenide |
| Metal selenide | Metal oxide |
| Metal selenide | Metal sulfide |

Through the construction of core-shell particles it is possible to exert targeted control over their properties, especially their optical properties.

It is also possible, in accordance with one further version of the invention, for the mixed inorganic/organic phase to comprise organic dyes and/or organic color pigments. The substrate is preferably a mixed inorganic/organic phase which comprises organic dyes and/or organic color pigments.

It has been found, surprisingly, that virtually any inorganic particle material can be used as nanoscale particles. It is preferred, however, to use oxidic materials.

When inorganic, preferably metal-oxidic, nanoparticles are used, it is possible to influence not only the materials properties but also the optical properties, such as, for example, refractive index of the platelet-shaped substrate. For instance, the coloration of the platelet-shaped substrates produced using the mixed inorganic/organic phase, and hence of the effect pigments produced using these platelet-shaped substrates, can be influenced or adjusted.

When using magnetic nanoscale particles, of $Fe_3O_4$, for example, in the mixed inorganic/organic phase, it is possible to influence or adjust the magnetic properties of the effect pigments produced using the platelet-shaped substrates. Magnetic effect pigments can be oriented in a magnetic field, as for example in a nail varnish, hence allowing specific optical effects to be induced. Furthermore, the magnetic orientation of the pigments also allows the provision of coatings having defined magnetic properties, a feature which can be used in the context of security applications, authenticity certificates, etc.

When using very hard nanoscale particles, made of corundum, for example, it is possible to provide platelet-shaped substrates featuring or comprising mixed inorganic/organic phases, with a very high point hardness. A high point hardness is of advantage, since effect pigment produced using these platelet-shaped substrates exhibits enhanced mechanical stability, without having an abrasive action in the application.

All of the above observations concerning the mixed inorganic/organic phase comprising organic network or organic matrix and inorganic network or inorganic matrix apply correspondingly when organic and/or inorganic nanoparticles are used in the mixed inorganic/organic phase.

The organic and/or inorganic nanoparticles may be provided with reactive surface modifiers which allow at least partial covalent attachment to the organic component and/or inorganic component. In this case the abovementioned network formers may be applied as surface modifiers to the preferably inorganic, more preferably metal-oxidic or metallic, nanoparticles. Thus, for example, gold nanoparticles may be coated with aminosilanes and subsequently incorporated into the mixed phase.

The amount of nanoscale particles in the mixed inorganic/organic phase is situated preferably in a range from 1% to 200% by weight, more preferably from 2% to 100% by weight, and more preferably still from 10% to 50% by weight, based in each case on the weight of the mixed inorganic/organic phase.

In accordance with the invention it is preferred for the platelet-shaped substrate featuring or comprising mixed inorganic/organic phase to have an average size $d_{50}$ in a range from 1 to 5000 µm, more preferably from 2 to 500 µm, more preferably still 2.5 to 250 µm. Also having proven very suitable are size ranges from 1 to 3 µm, preferably for use in cosmetology; from 5 to 10 µm, preferably for use in printing inks; and from 10 to 30 µm, preferably for use in varnish.

The average size is the $d_{50}$ value of the volume-average cumulative undersize distribution as determined by means of light diffraction methods (Fraunhofer diffraction). In this context it is preferred to use the Cilas 1064 instrument (from Cilas, France).

It is further preferred, in accordance with the invention, for the platelet-shaped substrate featuring or comprising mixed inorganic/organic phase to have a circular or elliptical shape or to be a polygon $V_n$, where n is the number of vertices, with $n \geq 3$, and to have a largely uniform size and shape. For example, n may be 4, 5, 6, 7, 8, etc.

A largely uniform size in accordance with the invention means that preferably more than about 80%, more preferably more than 90%, even more preferably more than 95%, of the platelet-shaped substrates—and hence of the effect pigments produced using these substrates —have an average size with a standard deviation of less than 20%, preferably of less than 10%, more preferably of less than 5%.

A largely uniform shape in accordance with the invention means that preferably more than about 80%, more preferably more than 90%, even more preferably more than 95%, of the platelet-shaped substrates—and hence of the effect pigments produced using these substrate—have the same shaping—for example, triangular, square, rectangular, pentagonal, hexagonal, heptagonal, octagonal, etc., or circular or ellipsoidal.

It is further preferred for the platelet-shaped substrate in circular or elliptical shape to have a circular diameter or a major elliptical axis having a length of 4 to 250 μm, and for the polygonal $V_n$ to have a diameter of 3 to 250 μm.

In accordance with the invention it is preferred for the at least one high-index coating with which the substrate is coated on at least one side to be a metal oxide layer having a refractive index $n \geq 2.0$. Preferably the platelet-shaped substrate is coated envelopingly with at least one metal oxide layer having a refractive index $n \geq 2.0$.

It has proven very advantageous for the platelet-shaped substrate to have the following coating:
(A) at least one, preferably enveloping, coating having a refractive index $n \geq 2.0$
(B) at least one, preferably enveloping, coating having a refractive index $n \leq 1.8$
(C) at least one, preferably enveloping, coating having a refractive index $n \geq 2.0$
(D) optionally further layers, protective layers or surface modifications.

It is preferred for the at least one metal oxide layer and/or metal hydroxide layer having a refractive index $n \geq 2.0$ or the coatings (A) and/or (C) to be selected from the group consisting of titanium dioxide, preferably rutile, anatase and/or pseudobrookite, iron oxide, preferably hematite, goethite and/or magnetite, cerium oxide, chromium oxide, tin oxide, zirconium oxide, cobalt oxide, and mixtures thereof.

In another version of the present invention the semitransparent metal layer is applied largely envelopingly, preferably envelopingly, to the platelet-shaped substrates.

The semitransparent metal layer may in this case be applied in addition to metal oxide layers, preferably in alternating sequence in relation to the refractive index of metal oxide layers. The semitransparent metal layers are preferably applied as an outermost layer of the effect pigments of the invention.

In one preferred embodiment the effect pigments have the construction below. The following layers are applied to the platelet-shaped substrate featuring or comprising mixed inorganic/organic phase:
(A) at least one, preferably enveloping, semi-transparent metal layer
(B) at least one, preferably enveloping, coating having a refractive index $n \leq 1.8$
(C) at least one, preferably enveloping, semi-transparent metal layer
(D) optionally further layers, protective layers or surface modifications.

The semitransparent metal layer is preferably selected from the group consisting of Au, Ag, Cu, Al, Fe, Cr, Zn, and mixtures and alloys of these metals.

In another preferred version of the invention the layer (B) is composed of silicon oxide, preferably $SiO_2$, aluminum oxide, preferably $Al_2O_3$, AlOOH, boron oxide or $MgF_2$.

In one preferred development of the invention the effect pigments of the invention are coated with at least one further mixed inorganic/organic phase, or mixed layer. Preferably at least one further mixed inorganic/organic phase or mixed layer with which the effect pigments of the invention are coated is the outermost layer of the effect pigment.

The mixed inorganic/organic layer may have the same composition as the platelet-shaped substrate or a composition different therefrom. The compositions in the platelet-shaped substrate with mixed inorganic/organic phase and of the additional mixed inorganic/organic layer are preferably identical or virtually identical, so as to have comparable materials properties, in respect of elasticity or flexibility, for example.

In other developments according to the invention, one or more coatings, either only inorganic or only organic in nature, may be applied to the substrate featuring or comprising mixed inorganic/organic phase, and these layers may also be arranged in alternation. For example, it is possible, atop the platelet-shaped substrate featuring or comprising mixed inorganic/organic phase, first to arrange one or more purely inorganic layers, metal oxide layers for example, preferably having different refractive indices, and to apply, as (an) outermost layer(s), one or more purely organic layers and/or mixed inorganic/organic layers. The production and application of such layers to platelet-shaped substrates are very well known to the skilled worker.

In order to increase the weathering stability, the effect pigments of the invention preferably have metal oxide layers which consist of or comprise $SiO_2$. A further preferred version consists of a cerium oxide layer followed by an $SiO_2$ layer. Layer sequences of this kind are extremely advantageous particularly in the case of weathering-stable effect pigments such as pearlescent pigments.

The layer thicknesses of purely inorganic or organic layers are between 2 and 1000 nm, preferably between 5 and 500 nm, and very preferably between 7 and 100 nm.

"Purely inorganic" layers here are layers having an organic fraction of below 2% by weight. "Purely organic" layers are understood in accordance with the invention to be layers having an inorganic fraction of below 2% by weight. The above figures in % by weight relate in each case to the weight of the respective layer.

It has been found, surprisingly, that the performance advantages of the increased mechanical stability of effect pigments with a substrate featuring or comprising mixed inorganic/organic phase are largely independent of whether there are further purely inorganic or purely organic layers present. It can be of advantage when coating first to begin with an inorganic component. In this way it is possible to bring about better adhesion of the subsequent layers on the substrate. This is the case especially when the mixed inorganic/organic phase of the platelet-shaped substrate contains very hydrophobic constituents, such as organofluorine functionalities, for example.

A further coating of the mixed inorganic/organic phase with a—for example, pure—oxide layer is likewise advantageous. In certain circumstances a desired organic-chemical surface modification can be carried out very much more effectively on this oxide layer than may be possible in the case of the mixed phase. This is especially so when the mixed phase has very hydrophobic constituents and/or has a very high fraction of organic oligomer and/or polymer (e.g., >50% by weight).

In the case of a purely inorganic coating of metal oxides/hydroxides, the latter are selected preferably from oxides, metal oxide hydrates, suboxides and/or hydroxides of the elements silicon, titanium, aluminum, zirconium, iron, copper, tin, cobalt, chromium, cerium, nickel, tin, vanadium, tantalum, yttrium, molybdenum, and tungsten, and mixtures thereof. The precipitation of such a layer onto platelet-shaped pigments or substrates for the purpose of producing effect pigments is very well known to the skilled worker.

The object on which the invention is based is also achieved by means of a method of producing effect pigments of any of claims 1 to 40, the method comprises the following steps:
a) combining at least one organic network former and at least one reactive organic component and at least one inorganic network former and/or nanoscale inorganic particles and also a liquid phase to form a reaction composition,
b) applying the reaction composition to a sheetlike base, c) forming a solidified mixed inorganic/organic phase,
d) converting the mixed inorganic/organic phase into platelet-shaped substrates,
e) coating the platelet-shaped substrates with at least one coating of semitransparent metal and/or at least one high-index coating having a refractive index $\geq 2.0$.

Preferred developments of the method of the invention are specified in dependent claims 42 to 48.

All of the observations which were made in respect of the effect pigments of the invention apply correspondingly. Applicable in particular are all observations relating to the reagents, and substances and coatings, that are to be used.

The combining of the starting materials used in step (a) may take place using typical mixing techniques: for example, stirring, etc. The reaction composition thus prepared is then for application, preferably in the liquid state, to a sheetlike base, in order, for example, to produce a film, from which, after solidification, the platelet-shaped substrates are produced.

The solidifying in step (c) may be brought about, for example, by drying of the reaction composition, i.e., volatilization of the liquid phase, water and/or organic solvent, for example, and/or reaction of the starting materials. The solidifying of the reaction composition may be accomplished by raising the temperature, irradiating UV light, IR rays, electron beams and/or gamma rays, etc.

Solidifying may be accomplished by crosslinking of the organic components, as for example by free-radical reaction, to form an organic network or an organic matrix.

Solidifying may be accomplished by crosslinking of the inorganic component, as for example by hydrolysis of alkoxy groups of inorganic metal-acid esters, and condensation of the resultant OH groups, and elimination of water. This procedure may also be referred to as a sol-gel process.

The crosslinking of the organic components and of the inorganic components may take place separately from one another or alongside one another.

The converting of the mixed inorganic/organic phase into platelet-shaped substrates in step (d) may take place by removal of the solidified mixed inorganic/organic phase from the sheetlike base and subsequent comminution, or with comminution during or before removal from the sheetlike base. Comminution may be accomplished, for example, by mechanical action and/or ultrasound.

The substrates obtained in this way may be dried and/or classified. The substrates may also be converted into a paste-like form.

The coating of the platelet-shaped substrates with at least one semitransparent metal and/or at least one high-index coating having a refractive index $\geq 2.0$, to provide the effect pigments of the invention, can take place using the customary methods that are familiar to a skilled worker.

After the effect pigments of the invention have been produced, they can be provided in the form of an effect pigment suspension, effect pigment paste or dust-free or low-dust dry preparation. The dry preparation typically has a moisture content, of water and/or organic solvent, for example, in a range of up to 15% by weight, preferably from 0.5% to 10% by weight, more preferably still from 2% to 8% by weight, based in each case on the total weight of the dry preparation.

In one preferred development of the method of the invention, the sheetlike base has structuring or embossing.

When a structured or embossed sheetlike base is used, then, it is possible to provide platelet-shaped substrates which on one or both surfaces likewise have a corresponding structuring or embossing. In order to obtain structuring or embossing on both sides of the platelet-shaped substrates, it is possible, for example, following application of the reaction composition to the structured or embossed sheetlike base, to place a correspondingly structured or embossed area, in film form or as a die, for example, on the film of mixed inorganic/organic phase produced, and so the structuring or embossing takes place on the top and bottom sides of this film.

This structuring or embossing may then be retained in the course of the subsequent operations of coating with high-index materials or semitransparent metal layers, thus making it possible to provide very interesting optical effects, examples being effect pigments featuring a rainbow effect. Substrates with such structuring preferably have 6000 to 20 000 lines per cm and more preferably 8000 to 16 000 lines per cm.

The sheetlike base may also take the form of a—preferably printable—matrix stencil. Following application of the reaction composition prepared in step (a), it can be applied in a printing operation to a sheetlike base, thus making it possible to provide platelet-shaped substrates of uniform size and/or shape and/or embossing and/or structuring.

The structuring or embossing of the sheetlike base is preferably regular, and so in step (d) the mixed inorganic/organic phases are converted into platelet-shaped substrates having largely uniform size and/or shape and/or embossing and/or structuring.

The embossing and/or structuring may also serve for the formation of regular predetermined breakage edges, and so later, during comminution of the mixed inorganic/organic phase, provided typically in the form of a film, platelet-shaped substrates are obtained that are of largely uniform shape and size. The embossing or structuring may of course be designed such that the platelet-shaped substrates, following application of the reaction composition in step (b) to the sheetlike base, are formed in such a way as to be separated from one another. In the latter case, then, separation of the platelet-shaped substrates from one another is unnecessary; they need only be separated from the base.

In one preferred development the sheetlike base takes the form of a circulating belt or roll. This version of the method permits, advantageously, a continuous method procedure.

The circulating belt or the roll may be passed, for example, following application and solidification of the mixed inorganic/organic phase, through water and/or organic solvent, in order to separate the mixed inorganic/organic phase from the circulating belt or the surface of the roll. Separation may also, however, take place, additionally or alternatively, by thermal and/or mechanical means.

The sheetlike base is preferably a sheetlike support material which is provided preferably with a release coat. The release coat facilitates the separation or detachment of the solidified mixed inorganic/organic phase. The release coat may, for example, melt under the influence of heat, and/or be dissolved by water and/or organic solvent, with the consequence that the solidified mixed inorganic/organic phase can be separated off and, subsequently or simultaneously, comminuted to the desired substrate size.

The object on which the invention is based is also achieved through the use of the effect pigments of any of claims 1 to 40 in varnishes, automobile finishes, powder coatings, paints, printing inks, security-printing inks, facade coatings, construction coatings, plastics, ceramics, glass or cosmetic preparations.

The object of the invention is likewise achieved by means of a coating composition which comprises effect pigments of any of claims 1 to 40 and at least one binder and/or film former.

The object is achieved, finally, by provision of an article provided with effect pigments of any of claims 1 to 40 or a coating material of claim 50.

EXAMPLES

The following examples are provided only for the purpose of illustrating the invention and they are not to be construed as limiting.

Example 1

Production of the Substrates:

A glass beaker was charged with 20 g of isopropanol and the reaction constituents according to table 1 were combined (sequence: as per the column arrangement) and mixed intensely using a high-speed stirrer. All reactions additionally contained 0.1 g of the wetting agent BYK-345 (from Byk-Chemie, Wesel, Germany).

Application:

The sol was applied by means of a doctor blade to a circulating belt made of a polyterephthalate. The film thickness was adjusted by the wet film thickness and/or solids content of the sol.

Examples 1f and 1m pass through a heating section in which the sol is heated to 70° C.

All of the other examples pass through a section irradiated with UV light, within which the organic component underwent curing.

The sol films were subsequently dried by flashing.

The organically precrosslinked hybrid films were then formed into an inorganic network by transferring to a water bath containing 0.02% by weight of a wetting agent (Disperbyk-184). In the course of this operation, the alkoxy groups of the inorganic metal-acid esters were hydrolyzed and very largely condensed. An inorganically and organically crosslinked hybrid system was formed. At the same time, the sol film underwent detachment from the sheet material.

TABLE 1

Reaction components

| Example | TEOS | MEMO | Zr/MAA | MAA | TMPTMA | $H_2O$ | AcOH | Free-radical initiator |
|---|---|---|---|---|---|---|---|---|
| 1a | 4 g | 1 g | | | 1 g | 0.6 g | 0.1 g | thermal, AIBN |
| 1b | 4 g | 1 g | | | 1 g | 0.6 g | 0.1 g | UV, Irgacure 651 |
| 1c | 1 g | 1 g | | | 1 g | 0.2 g | 0.1 g | UV, Irgacure 651 |
| 1d | 1 g | 1 g | | | 4 g | 0.2 g | 0.1 g | UV, Irgacure 651 |
| 1e | 1 g | 4 g | | | 4 g | 0.5 g | 0.1 g | UV, Irgacure 651 |
| 1f | 1 g | 4 g | | 1 g | 4 g | 0.6 g | 0.2 g | thermal, AIBN |
| 1g | 1 g | 4 g | | 1 g | 4 g | 0.6 g | 0.2 g | UV, Irgacure 651 |
| 1h | 4 g | — | 1 g | | 1 g | 0.5 g | 0.1 g | UV, Irgacure 651 |
| 1i | 4 g | 1 g | 1 g | | 1 g | 0.6 g | 0.1 g | UV, Irgacure 651 |
| 1j | 1 g | 1 g | 1 g | | 1 g | 0.3 g | 0.1 g | UV, Irgacure 651 |
| 1k | 1 g | 1 g | 1 g | | 4 g | 0.3 g | 0.1 g | UV, Irgacure 651 |
| 1l | 1 g | 4 g | 1 g | | 4 g | 0.5 g | 0.2 g | UV, Irgacure 651 |
| 1m | 1 g | 4 g | 1 g | 1 g | 4 g | 0.7 g | 0.2 g | thermal, AIBN |
| 1n | 1 g | 4 g | 1 g | 1 g | 4 g | 0.7 g | 0.2 g | UV, Irgacure 651 |

TEOS = Tetraethoxysilane (Degussa)
MEMO = Methacryloyloxypropyltrimethoxysilane (Degussa)
Zr/MAA = Zirconium-methacrylic acid complex
MAA = Commercial methacrylic acid
TMPTMA = Trimethylolpropane trimethacrylate
AIBN = 2,2'-Azobis(isobutyronitrile)
Irgacure 651 = Benzyl dimethyl ketal (Ciba)
AcOH: Acetic acid The hybrid particles detached are separated off by a suction filter and washed to remove any remaining monomers or soluble oligomeric constituents.

Finally the detached reference of film were then dispersed in water and comminuted using an Ultraturrax device.

Example 2

TiO$_2$ Coating of Hybrid Particles as per Example 1d

The hybrid platelets from example 1d are subsequently dispersed in water and coated with TiO$_2$ by slow metered addition of TiOCl$_2$ at a pH of 1.4 until a blue interference color is obtained.

Subsequently the coated inorganic/organic hybrid particles obtained are washed salt-free, dried, and heated at temperatures of 400° C. under a protective atmosphere (N$_2$).

This gives pearlescent pigments based on inorganic-organic hybrid platelets, having a high gloss and an intense blue interference color.

Example 3

Aftercoating of the Pearlescent Pigments, Produced in Example 2, with an Organic/Inorganic Layer:

100 g of TiO$_2$-coated hybrid flakes as per example 2 are dispersed in 400 ml of isopropanol and brought to boiling temperature. Then 10.0 g of DI water are added. Subsequently, over a time of 30 minutes, a solution of 15.0 g of tetraethoxysilane in 40.0 g of isopropanol is introduced continuously using a metering pump (Ismatec). At the same time, the addition of solution A (metering rate 1.0 ml/min) is commenced. 10 minutes after the beginning of the addition of tetraethoxysilane, a solution B is additionally introduced, likewise at 1.0 ml/min. 3 minutes after the beginning of the metered addition of solution B, and a further 30 minutes later, in each case one spatula tip of 2,2'-azobis(isobutyronitrile) (AIBN) is added. After the end of the addition of solution B, the reaction mixture is stirred at reflux for a further 6 hours. After slow cooling to room temperature, the mixture is stirred overnight. The reaction product is separated off on a Büchner funnel and dried in a vacuum drying cabinet at 80° C. for 6 hours.

Solution A: 5.0 g of 25% strength aqueous NH$_4$OH, in solution in 150 ml of isopropanol.

Solution B: 0.70 g of Dynasylan MEMO, 3.00 g of TMPTMA, and 0.50 g of allyl methacrylate, in solution in 100 ml of isopropanol.

Example 4

Silver Coating of Hybrid Particles as per Example 1

100 g of the hybrid flakes as per example id are coated electrolessly with a dense layer of silver. For this purpose an ammoniacal silver nitrate solution is added to an aqueous dispersion of the hybrid flakes (10% by weight hybrid flakes) and stirred intensely (contains 12 g of AgNO$_3$). Then an aqueous solution of D-glucose is added to the reaction mixture, which is stirred at 60° C. for 2 hours. The silver content of the resulting product is 10%. The silver-coated hybrid particles are isolated by filtration, washed, and dried at 100 to 250° C., if appropriate under a protective atmosphere. Highly lustrous effect pigments are obtained which have a pronounced color flop.

Example 5

Hybrid Particles as per Example 1 with Groove Structure

The procedure of example 1 is repeated, but the sol applied to the belt is embossed with a die (PET) after a few minutes of reaction time. The die has a regular groove structure with a groove spacing of 14 000 lines per cm. The procedure is otherwise as described in example 1.

Subsequently, in the same way as in example 4, a semi-transparent silver layer is applied to the substrate.

The inorganic/organic hybrid particles obtained show an exact impression of the embossed groove structure. On a black substrate, depending on the viewing angle, all of the colors of the rainbow are seen.

Example 6

Hybrid Particles as per Example 1d with Uniform Size and Shape

The procedure of example 1d is repeated, but the support used for producing the inorganic-organic hybrid particles is a PET sheet whose surface is embossed with a regular square structure of defined edge length (e.g., 40 μm).

As a result of the square structure on the sheet, the fracture edges are predefined and, when the support is detached or in the course of subsequent comminuting, the hybrid platelets break preferably at an edge length of 40 μm. This produces hybrid platelets having a virtually uniform particle size and shape.

What is claimed is:

1. Effect pigments with a platelet-shaped substrate provided at least on one side with at least one of at least one coating of semitransparent metal and at least one high-index coating having a refractive index≧2.0, wherein the platelet-shaped substrate comprises at least one mixed inorganic/organic phase.

2. The effect pigments of claim 1, wherein at least a portion of at least one said mixed phase has an inorganic network that has one or more inorganic oxide components, and at least one organic component, with the proviso that the fraction of the organic component is 2% to 98% by weight, based on the weight of the total mixed inorganic/organic phase.

3. The effect pigments of claim 1, wherein the substrate is composed of a mixed inorganic/organic phase.

4. The effect pigments of claim 2, wherein the organic component is at least one of an organic oligomer and an organic polymer.

5. The effect pigments of claim 2, wherein the organic component is covalently bonded at least partly to the inorganic network via at least one organic network former.

6. The effect pigments of claim 5, wherein the at least partial covalent bonding of the inorganic oxide component and at least one of organic oligomer and organic polymer is accomplished at least partly through one or more organic network formers of at least one of the general formula (I)

$$R^1{}_nR^2{}_mR^3{}_oSiX_{(4-n-m-o)} \quad (I)$$

where X is a hydrolyzable group after whose hydrolysis a covalent bond of organic network former to the inorganic network can be formed and R$^1$ is a reactive organic group which is covalently bondable to the at least one of organic oligomer and organic polymer, R$^2$ and R$^3$ independently of one another are each an organic group which may be covalently bondable to the at least one of organic oligomer and organic polymer, with the proviso that n, m and o are integers, with n+m+o=1-3 and n=1 to 3, m=0 to 2, and o=0 to 2, and the general formula (II)

$$(R^1O)_n(R^2O)_m(R^3O)_oMX_{(k-n-m-o)} \quad (II)$$

where the compound has at least one hydrolyzable group X after whose hydrolysis a covalent bond of organic network former to the inorganic network can be formed, at least one organic radical $R^1$ which is a reactive organic group which is covalently bondable to the at least one of an organic oligomer and an organic polymer, and $R^2$ and $R^3$ independently of one another may each be an organic group which may be covalently bondable to the at least one of an organic oligomer and organic polymer, where k is the formal oxidation number of M,
M is Al, Zr or Ti,
n is an integer from 1 to (k-1),
m is an integer from 0 to (k-2),
o is an integer from 0 to (k-2), and
where n+m+o is an integer from 1 to k-1.

7. The effect pigments of claim 2, wherein the inorganic oxide component of the mixed phase is selected from the group consisting of metal oxide, metal suboxide, metal hydroxide, metal oxide hydrate, and mixtures thereof.

8. The effect pigments of claim 7, wherein the inorganic oxide component of the mixed phase is selected from at least one selected from the group of metal oxide, metal suboxid, metal oxide hydrate and metal hydroxide of elements selected from the group consisting of silicon, aluminum, titanium, zirconium, iron, cerium, chromium, manganese, zinc, tin, antimony, boron, magnesium, and mixtures thereof.

9. The effect pigments of claim 6, wherein the organic network former is a silane of the general formula (I), the hydrolyzable group(s) X being selected independently of one another from the group consisting of halogen, hydroxyl, alkoxy having 1-10 C atoms, which may be straight-chain or branched, and mixtures thereof.

10. The effect pigments of claim 6, wherein the organic network former possesses the general formula (II), the hydrolyzable group(s) X being selected independently of one another from the group consisting of halogen, hydroxyl, alkoxy having 1-20 C atoms, which may be straight-chain or branched and mixtures thereof.

11. The effect pigments of claim 6, wherein $R^1$ is a reactive organic radical which has one or more substituents selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, and carbamate group and mixtures thereof.

12. The effect pigments of claim 6, wherein $R^2$ and $R^3$ are selected independently of one another from the group consisting of H—, $(C_1-C_{40})$-alkyl-, $(C_1-C_{40})$-fluorinated alkyl-, $(C_1-C_{40})$-partially fluorinated alkyl-; $(C_2-C_{40})$-alkenyl-, $(C_2-C_{40})$-alkynyl-; $(C_6-C_{36})$-aryl-, fluorinated $(C_6-C_{36})$-aryl-, partially fluorinated $(C_6-C_{36})$-aryl-; $(C_7-C_{40})$-alkylaryl-, $(C_7-C_{40})$-arylalkyl-, fluorinated $(C_7-C_{40})$-alkylaryl-, partially fluorinated $(C_7-C_{40})$-alkylaryl-; $(C_8-C_{40})$-alkenylaryl-, $(C_8-C_{40})$-arylalkynyl-, $(C_8-C_{40})$-alkynylaryl-; $(C_5-C_{40})$-cycloalkyl-, $(C_6-C_{40})$-alkylcycloalkyl-, $(C_6-C_{40})$-cycloalkylalkylsilanes, and mixtures thereof.

13. The effect pigments of claim 2, wherein the at least one of the organic oligomer and the organic polymer is constructed from monomers with functionalities selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, carbamate, and ester group and mixtures thereof.

14. The effect pigments of claim 2, wherein the organic component is constructed from at least one of reactive organic oligomers and reactive organic polymers which have reactive groups which are able to attach to at least one of the inorganic network and the group $R^1$ of the organic network formers.

15. The effect pigments of claim 14, wherein the at least one of the reactive organic oligomer the reactive organic polymer is selected from the group consisting of trialkoxysilane-modified polyethyleneimines, and aminosilane-modified polyethylene oxide urethanes, and mixtures thereof.

16. The effect pigments of claim 14, wherein the at least one of the reactive organic oligomer and the reactive organic polymer is selected from the group consisting of polyacrylates, polymethacrylates, polyethers, polyesters, polyamines, polyamides, polyols, polyurethanes, and polyolefins, at least one of these oligomers and polymers having reactive functional groups which are able to bond to the inorganic network or an organic network former.

17. The effect pigments of claim 6, wherein the at least one of the organic oligomer and organic polymer is covalently bonded via the functional groups $R^1$ of one or more organic network formers in the mixed inorganic/organic phase.

18. The effect pigments of claim 1, wherein the organic component of the mixed inorganic/organic phase of the substrate is at least partly derived from at least one organic network modifier having the general formula (III)

$$R^1_nR^2_mR^3_oSiX_{(4-n-m-o)} \quad (III)$$

where X is a hydrolyzable group after whose hydrolysis a covalent bond of organic network modifier to the inorganic network can be formed,
and $R^1$, $R^2$, and $R^3$ independently of one another are each a nonreactive organic group, with the proviso
that n, m and o are integers, where n+m+o=1-3 and n=1 to 3, m=0 to 2, and o=0 to 2,
and one or more organic network modifiers having the general formula (IV)

$$(R^4O)_pMX_{(k-p)} \quad (IV)$$

where the compound has at least one hydrolyzable group X after whose hydrolysis a covalent bond of organic network modifier to the inorganic network can be formed, and
has at least one nonreactive organic radical $R^4$, where
k is the formal oxidation number of M,
M is Al, Zr or Ti, and
p is an integer from 1 to (k-1).

19. The effect pigments of claim 1, wherein at least one of the at least one mixed inorganic/organic phase of the substrate and the substrate has a refractive index<1.8.

20. The effect pigments of claim 1, wherein the substrate comprising at least one mixed inorganic/organic phase comprises colored or colorless nanoscale particles of metal, metal oxide, metal sulfide, metal nitride or mixtures or core-shell particles thereof.

21. The effect pigments of claim 1, wherein the substrate is a mixed inorganic/organic phase which comprises colored or colorless nanoscale particles of metal, metal oxide, metal sulfide, metal nitride or mixtures or core-shell particles thereof.

22. The effect pigments of claim 20, wherein the colored or colorless nanoscale particles are selected from metal of the group consisting of Au, Ag, Cu, Pt, Pd, Ni, and alloys of these metals.

23. The effect pigments of claim 20, wherein the colored or colorless nanoscale particles are a metal oxide selected from the group consisting of oxides of the elements Si, Al, Zr, Ti, V, Mn, Co, Fe, Cr, Mo, W, Cu, Ag, Zn, Hf, Ta, In, Sn, Sb, lanthanides, actinides, and mixtures and mixed oxides thereof.

24. The effect pigments of claim 20, wherein the colored or colorless nanoscale particles are a metal sulfide selected from the group consisting of CdS, PbS, $MoS_2$, CuS, AgS, ZnS, $In_2S_3$, $Sb_2S_3$, and mixtures and mixed sulfides thereof.

25. The effect pigments of claim 1, wherein the substrate comprising at least one mixed inorganic/organic phase comprises at least one of organic dyes and organic color pigments.

26. The effect pigments of claim 25, wherein the substrate is a mixed inorganic/organic phase which comprises at least one of organic dyes and organic color pigments.

27. The effect pigments of claim 1, wherein the substrate has an average size of 0.5 to 2000 μm.

28. The effect pigments of claim 1, wherein the substrate has an average thickness of 20 to 5000 nm.

29. The effect pigments of claim 1, wherein the substrate has a circular or elliptical shape or is a polygon $V_n$, where n is the number of vertices, with n≧3, and wherein the polygon has a largely uniform size and shape.

30. The effect pigments of claim 29, wherein the platelet-shaped substrate in circular or elliptical shape has a circular diameter or a major elliptical axis having a length of 4 to 250 μm and the polygon $V_n$ has a diameter of 3 to 250 μm.

31. The effect pigments of claim 1, wherein the platelet-shaped substrate is envelopingly coated with at least one metal oxide layer having a refractive index n≧2.0.

32. The effect pigments of claim 1, wherein the platelet-shaped substrate has the following coating:
(A) at least one coating having a refractive index n≧2.0;
(B) at least one coating having a refractive index n≦1.8; and
(C) at least one coating having a refractive index n≧2.0.

33. The effect pigments of claim 31, wherein the at least one metal oxide layer having a refractive index n≧2.0 is selected from the group consisting of titanium dioxide, iron oxide, cerium oxide, chromium oxide, tin oxide, zirconium oxide, cobalt oxide, and mixtures thereof.

34. The effect pigments of claim 1, wherein the semitransparent metal layer at least partially envelops the platelet-shaped substrates.

35. The effect pigments of claim 34, wherein the platelet-shaped substrate has the following coating:
(A) at least one semitransparent metal layer;
(B) at least one coating having a refractive index n≦1.8; and
(C) at least one semitransparent metal layer.

36. The effect pigments of claim 34, wherein the semitransparent metal layer is selected from the group consisting of silver, aluminum, chromium, titanium, nickel, gold, platinum, palladium, copper, zinc, iron, and mixtures and alloys of these metals.

37. The effect pigments of claim 35, wherein the layer (B) comprises at least one selected from the group consisting of silicon oxide, aluminum oxide, AlOOH, boron oxide, $MgF_2$ and mixtures thereof.

38. The effect pigments of claim 1, wherein the effect pigments are coated with at least one further mixed inorganic/organic phase.

39. The effect pigments of claim 38, wherein the at least one further mixed inorganic/organic phase with which the effect pigments are coated is the outermost layer of the effect pigment.

40. A method of producing the effect pigments of claim 1, wherein the method comprises the following steps:

a) combining at least one organic network former and at least one reactive organic component and at least one of at least one inorganic network former and nanoscale inorganic particles, and also a liquid phase to form a reaction composition,
b) applying the reaction composition to a sheetlike base,
c) forming a solidified mixed inorganic/organic phase,
d) converting the mixed inorganic/organic phase into platelet-shaped substrates,
e) coating the platelet-shaped substrates with at least one coating comprising at least one of semitransparent metal and at least one high-index coating having a refractive index≧2.0.

41. The method of claim 40, wherein the sheetlike base has structuring or embossing.

42. The method of claim 41, wherein the structuring or embossing of the sheetlike base is regular, and so in step (d) the mixed inorganic/organic phases are converted into platelet-shaped substrates having at least one of a uniform size and shape.

43. The method of claim 40, wherein the sheetlike base is a matrix stencil.

44. The method of claim 40, wherein the sheetlike base is formed as a circulating belt or roll.

45. The method of claim 40, wherein the sheetlike base is a sheetlike carrier material.

46. The method of claim 40, wherein in step (c) the solidifying of the mixed inorganic/organic phase takes place with radiation curing.

47. A method for producing a material selected from the group consisting of varnishes, automobile finishes, powder coatings, paints, printing inks, security printing inks, facade coatings, construction coatings, plastics, ceramics, glass and cosmetic preparations, wherein the method comprises including in said material the effect pigments of claim 1.

48. A coating composition wherein the coating composition comprises the effect pigments of claim 1 and at least one selected from a binder and a film former.

49. An article, wherein the article is provided with the effect pigments of claim 1.

50. The effect pigments of claim 10, wherein the alkoxy having 1-20 C atoms contains heteroatoms in the carbon chain.

51. The effect pigments of claim 50, wherein the heteroatoms are at least one selected from the group consisting of O, S and N.

52. The effect pigments of claim 12, wherein at least one of $R^2$ and $R^3$ is substituted by at least one of an amino, hydroxyl, thiol, epoxy, acrylate, methacrylate, vinyl, allyl, alkenyl, alkynyl, carboxyl, carboxylic anhydride, isocyanate, cyanate, ureido, carbamate and ester group.

53. The effect pigments of claim 52, wherein at least one of $R^2$ and $R^3$ contains at least one heteroatom selected from the group consisting of O, N and S.

54. The effect pigments of claim 20, wherein the colored or colorless nanoscale particles have an average size of 1 to 200 nm.

55. The effect pigments of claim 21, wherein the colored or colorless nanoscale particles have an average size of 1 to 200 nm.

56. The effect pigments of claim 32, wherein at least one of coatings (A), (B) and (C) envelops the platelet-shaped substrate.

57. The effect pigments of claim 32, wherein the platelet-shaped substrate having coatings (A), (B) and (C) is provided with at least one selected from further coating layers, protective layers and surface modifications.

58. The effect pigments of claim 33, wherein the titanium dioxide is in at least one form selected from the group consisting of rutile, anatase and pseudobrookite.

59. The effect pigments of claim 33, wherein the iron oxide is in at least one form selected from the group consisting of hematite, goethite and magnetite.

60. The effect pigments of claim 32, wherein at least one of the coatings (A) and (C) is selected from the group consisting of titanium dioxide, iron oxide, cerium oxide, chromium oxide, tin oxide, zirconium oxide, cobalt oxide, and mixtures thereof.

61. The effect pigments of claim 60, wherein the titanium dioxide is in at least one form selected from the group consisting of rutile, anatase and pseudobrookite.

62. The effect pigment of claim 60, wherein the iron oxide is in at least one form selected from the group hematite, goethite and magnetite.

63. The effect pigment of claim 35, wherein at least one of the coatings (A), (B) and (C) envelops the platelet-shaped substrate.

64. The effect pigments of claim 35, wherein the platelet-shaped substrate having coatings (A), (B) and (C) is provided with at least one selected from further coating layers, protective layers and surface modifications.

65. The effect pigments of claim 37, wherein the silicon oxide is $SiO_2$.

66. The effect pigments of claim 37, wherein the aluminum oxide is $Al_2O_3$.

67. The method of claim 43, wherein the matrix stencil is a printable matrix stencil.

68. The method of claim 45, wherein the sheetlike carrier material is provided with a release layer.

69. The method of claim 46, wherein the radiation curing is effected by irradiation with at least one selected from the group consisting of UV light, IR rays, electron beams and gamma rays.

70. An article, wherein the article is provided with the coating composition of claim 48.

* * * * *